United States Patent [19]

O'Dell et al.

[11] Patent Number: 4,779,190
[45] Date of Patent: Oct. 18, 1988

[54] COMMUNICATION BUS INTERFACE

[75] Inventors: Robert R. O'Dell; John K. Burkey; Donald J. Girard, all of Cambridge, Ohio

[73] Assignee: NCR Corporation, Dayton, Ohio

[21] Appl. No.: 937,638

[22] Filed: Dec. 3, 1986

[51] Int. Cl.⁴ .............................................. G06F 13/12
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,978,456 | 8/1976 | Moran | 364/200 |
| 4,011,545 | 3/1977 | Nadir | 364/200 |
| 4,254,462 | 3/1981 | Raymond et al. | 364/200 |
| 4,271,466 | 6/1981 | Yamamoto | 364/200 |
| 4,344,130 | 8/1982 | Fung | 364/200 |
| 4,443,846 | 4/1984 | Adcock | 364/200 |
| 4,447,878 | 5/1984 | Kinnie | 364/200 |
| 4,503,500 | 3/1985 | Magar | 364/200 |
| 4,538,224 | 8/1985 | Peterson | 364/200 |

Primary Examiner—David Y. Eng
Attorney, Agent, or Firm—Wilbert Hawk, Jr.; Albert L. Sessler, Jr.; Richard W. Lavin

[57] ABSTRACT

A communication interface for controlling the transfer of data between a host processor configured to process data of a first length and a remote storage member configured to store data of a second length includes a bus controller for transferring data between the interface and the remote storage member, a data transfer member for controlling the transfer of data between the host processor and the interface, and a control processor for controlling operating of the bus controller and the transfer member. A first storage member stores data words of said second length and sequentially outputs the data words over a communication bus to the host processor configured to transmit data words of said first length. A second storage member stores data representing the operating status of the transfer member and the bus controller, enabling the control processor to monitor the status of the transfer member and the bus controller.

11 Claims, 10 Drawing Sheets

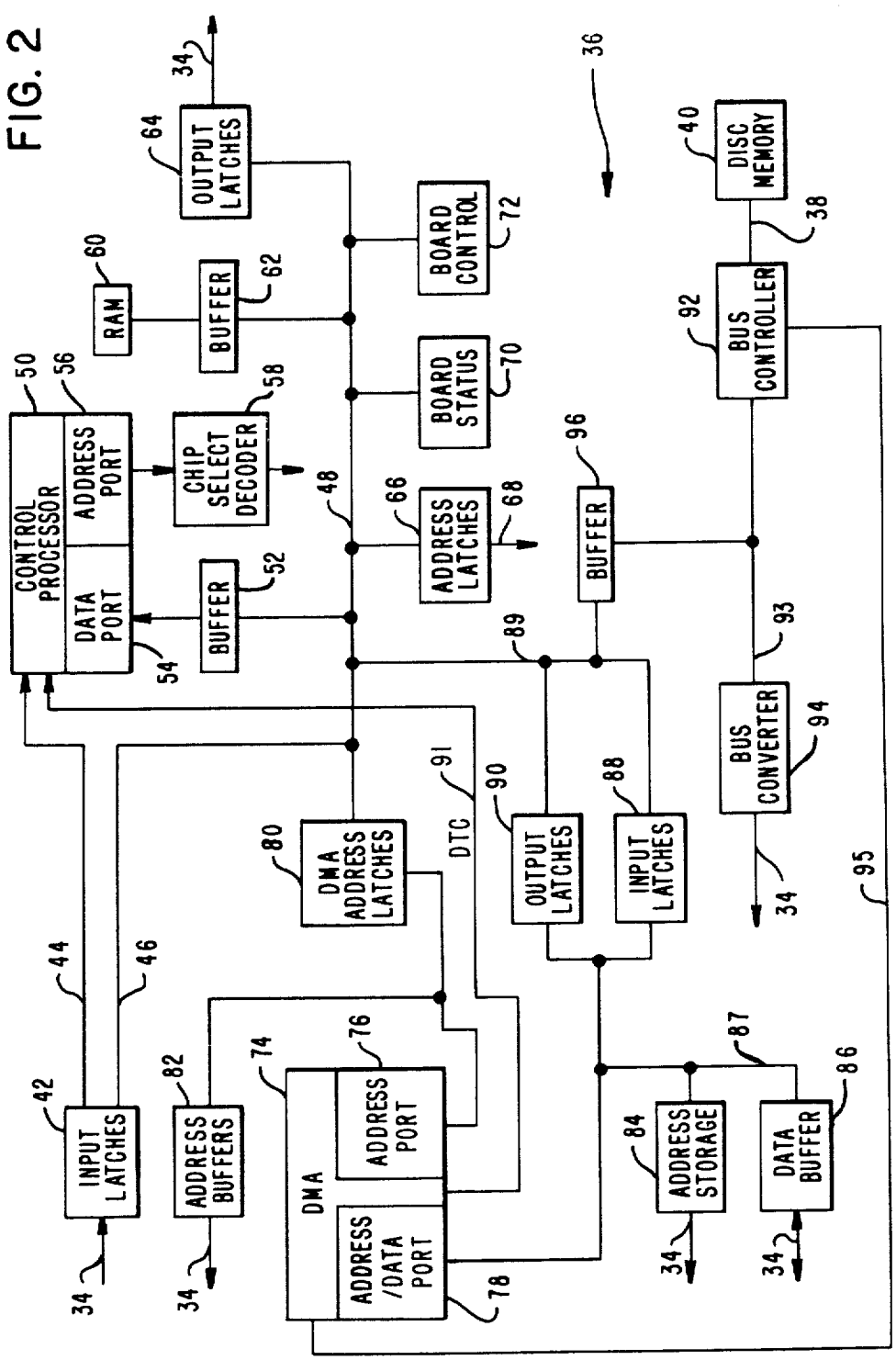

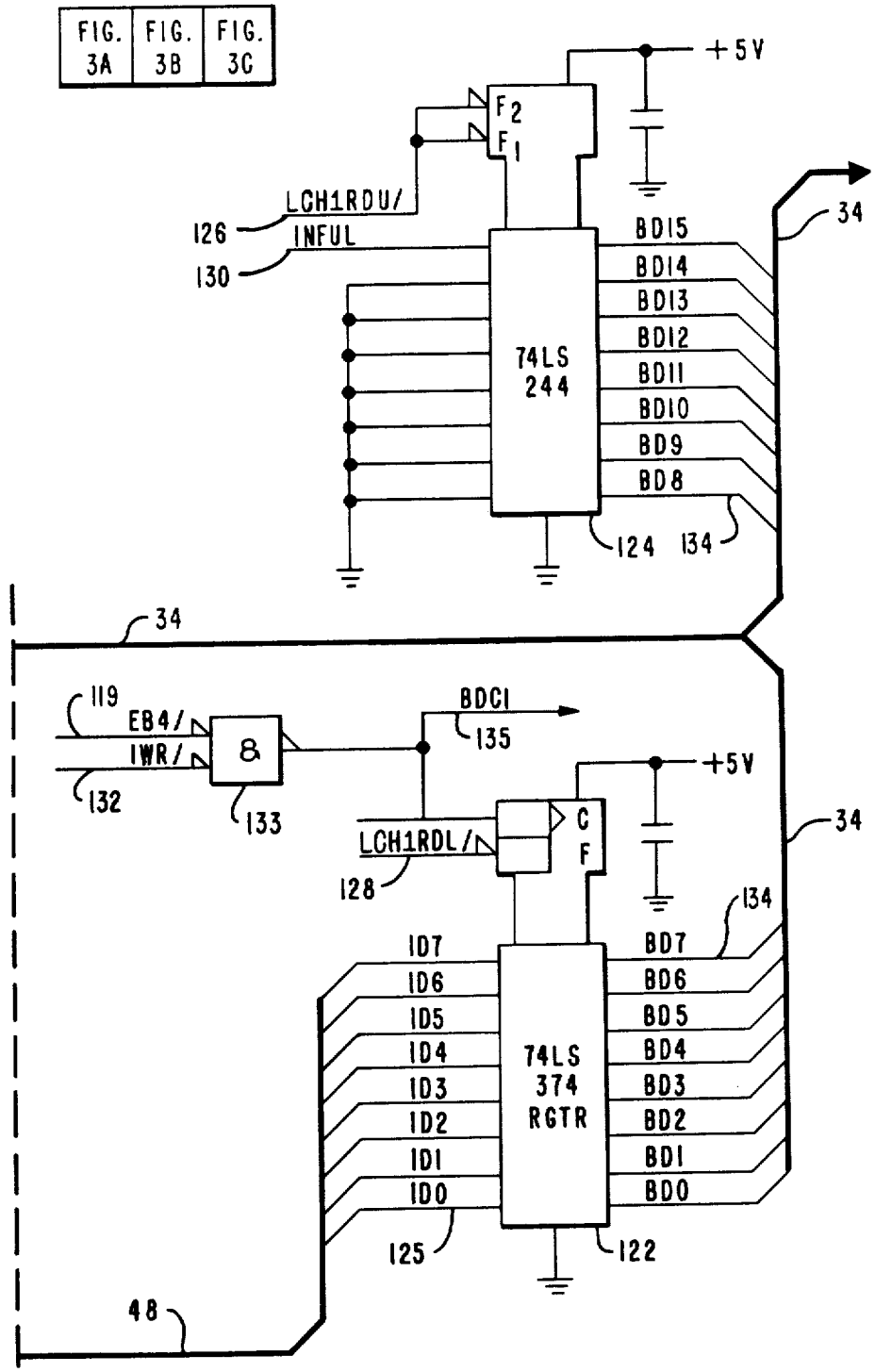

COMMUNICATION BUS INTERFACE

BACKGROUND OF THE INVENTION

The present invention relates to a data communication system over which data is transmitted between a plurality of remote data terminal devices and a host processor and more particularly relates to a system for transmitting data between the host processor and a remote device over a plurality of buses having different transmission characteristics.

Present day processing systems have included a central or host processor and a plurality of data handling peripheral devices. In order to update the processing system, peripheral devices are added to the system after the system has been in operation. Where the peripheral device which is to be added requires a bus construction which is different from that of the original processing system, the cost of redesigning the processing system to the new bus configuration becomes prohibitive while reducing the attractiveness of the system in the marketplace.

It is therefore a principal object of this invention to provide a low cost communication interface adapter which enables the bidirectional transmission of data between a host processor and a remote peripheral device each constructed to operate on buses having different transmission characteristics.

It is a further object of this invention to provide a communication interface adapter which is capable of transferring data between two different bus configurations at a high rate of speed.

SUMMARY OF THE INVENTION

These and other objects of the present invention are realized by providing an interface adapter for coupling a host processor with a remote peripheral device in which the interface includes a control processor and a DMA transmission control unit. In response to receiving data requiring the type of information that the host processor is requesting, the control processor will set up the DMA control unit to take control of the primary bus that connects the interface and the host processor. The DMA control unit will access a main memory in the host processor to obtain the required data to be used in addressing the remote peripheral device. A bus controller connected to the remote device over a secondary bus controls the transfer of data from the remote peripheral device and through a data converter which enables the eight bit data words received over the secondary bus from the remote peripheral device to be transmitted over the sixteen bit primary bus to the host processor. The interface includes status and control units enabling the control processor to monitor the transfer operation that is occurring between the remote peripheral device and the host processor.

BRIEF DESCRIPTION OF THE DRAWINGS

Additional advantages and features of the present invention will become apparent and fully understood from a reading of the following description taken together with the accompanying drawings in which:

FIG. 2 is a block diagram of the interface adapter of the present invention;

FIGS. 3A-3C inclusive taken together disclose a detailed logic diagram of the output latches and the input latches used in generating an interrupt signal to the control processor;

FIG. 4 is a diagram showing the manner in which FIGS. 3A-3C inclusive are arranged with respect to each other to form the logic circuits;

DESCRIPTION OF THE PREFERRED EMBODIMENT

Figure 1:
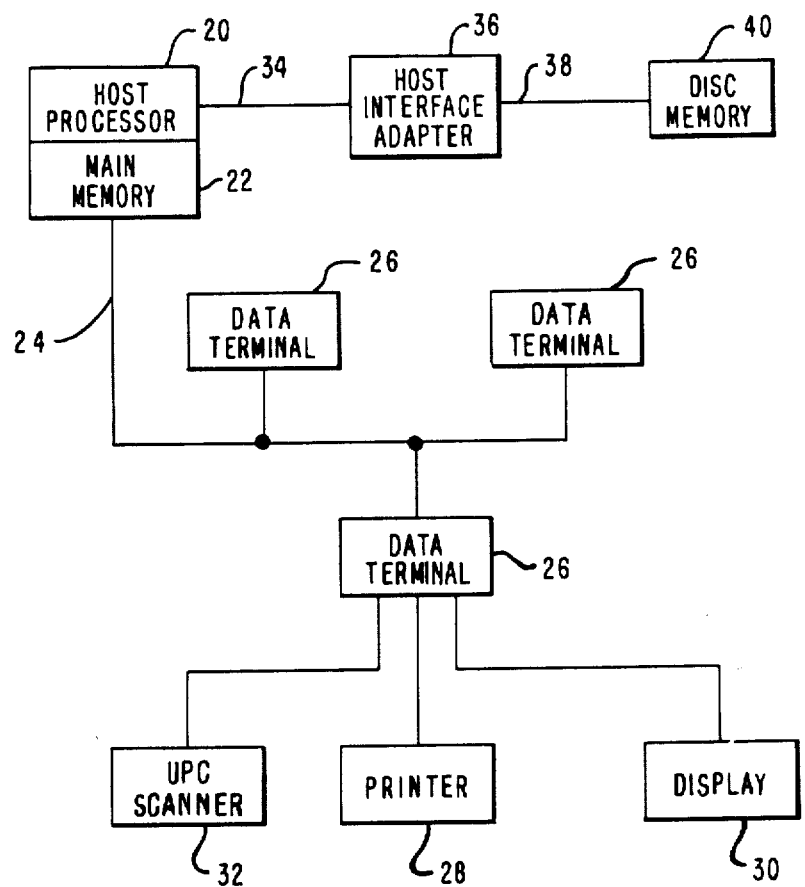
FIG. 1 is a block diagram of the data processing system which includes the interface adapter of the present invention.

Referring now to FIG. 1, there is shown a block diagram of a data processing system in which the interface adapter of the present invention is incorporated. The data processing system includes a host processor unit 20 which may comprise a Motorola 68000 processor having a main memory unit 22. The processor unit 20 is connected over a communication bus 24 to a plurality of data terminal devices 26 each of which in turn is connected to a plurality of peripheral devices such as a printer 28, a display 30 and a U.P.C. bar code scanner 32.

The host processor unit 20 is connected over a sixteen bit communication bus 34 to a host interface adapter 36 of the present invention which in turn is connected over an eight bit bus 38 to a peripheral device such as a disc memory 40. When the processing system involves the reading of a U.P.C. bar code label on a purchased merchandise item as part of a checkout operation, the data identifying the merchandise item read from the label is transmitted from the scanner 32 through its associated terminal device 26 to the host processor unit 20 over bus 24. The host processor unit 20 will output over bus 34 to the host interface adapter 36 four bytes of data including address data bits representing the address in the main memory unit 22 where there is stored data controlling the accessing of the disc memory 40 by the host processor to obtain the price of the purchased merchandise item.

As will be described more fully hereinafter, the host interface adapter 36, in response to receiving the address data bits from the processor unit 20, will enable the data stored in the disc memory 40 and representing the price of the purchased merchandise item to be transmitted from the disc memory to the terminal device 26 which will display the price on the display 30 and print the price on a receipt member utilizing the printer 28 in manner that is well known in the art.

Referring now to FIG. 2, there is disclosed a block diagram of the host interface adapter 36 (FIG. 1) which includes an input latches unit 42 connected to the host processor unit 20 over the sixteen bit data bus 34 (FIG. 1). The input latches unit 42 is connected over bus 44 and eight bit buses 46 and 48 to a control processor 50 through a buffer unit 52. The processor 50 which, in the present embodiment, is an Intel 8751 micro-controller, includes a data port 54 and an address port 56 through which data is transmitted. A chip select decoder 58 is connected to the address port 56 for receiving address data from the processor 50 to enable the operation of various elements in the host adapter.

Coupled to the bus 48 is a 2K RAM memory unit 60 in which data transmitted through a buffer unit 62 is stored for use in the operation of the control processor 50. An output latches unit 64 stores status data which is to be transmitted to the host processor 20 over bus 34 pertaining to the operating status of the host interface adapter 36. Also coupled to the bus 48 are address latches 66 which receive the lower eight bits of an address from the processor 20 to select various elements in the host interface adapter 36 for operation. A board status unit 70 and a board control unit 72 store data representing the current operating conditions of the host interface adapter 36 and are coupled to the bus 48 allowing the control processor unit 50 to monitor the operating status of various elements of the host interface adapter 36 in a manner that will be described more fully hereinafter.

The host interface adapter 36 further includes a DMA (direct memory access) communication control unit 74 for enabling data to be transferred between the host processor 20 (FIG. 1), the control processor 50 and the disc memory 40. Included in the DMA unit 74 are an address port 76 which outputs address bits and an address/data port 78 which receives data bits relating to the location in the main memory 22 (FIG. 1) of the host processor unit 20 of a control block of data pertaining to the transfer operation.

Associated with the DMA unit 74 is a DMA address latches unit 80 in which are stored address bits transmitted from the processor 50, and an address buffers unit 82 which receives address data bits from the DMA control unit 74 for transmission over bus 34 to the host processor 20 (FIG. 1). Also associated with the DMA control unit 74 is an address storage unit 84 in which are stored the address bits outputted from the control processor 50 and driven onto the bus 34 under the control of the DMA control unit 74. The host interface adapter 36 further includes a data buffer unit 86 in which data is transmitted between the host processor 20 and the processor 50 over a sixteen bit data bus 87. When data is being transmitted from the host processor 20 to the control processor 50, the data appearing on the bus 87 is temporarily stored in an input latches unit 88 before being transferred over buses 89 and 48 to the control processor 50. When the control processor 50 is transmitting data to the host processor 20, the data appearing on bus 89 is stored in an output latches unit 90 from where the data is then transmitted over bus 87 and through the data buffer unit 86 to the bus 34.

The host interface adapter 36 further includes a bus controller 92 for controlling the transfer of eight bit data words between the host interface adapter 36 and the disc memory 40. Each byte of data transmitted over the bus 38 to the controller 92 from the disc memory 40 is transmitted over an eight bit bus 93 to a bus converter 94 which transmits each of the eight bit data words appearing on the bus 93 over the sixteen bit bus 34. A buffer unit 96 connected between the control processor 50 and the bus controller 92 enables the processor 50 and the bus controller to operate simultaneously without danger of interference from the other.

Figure 3A:
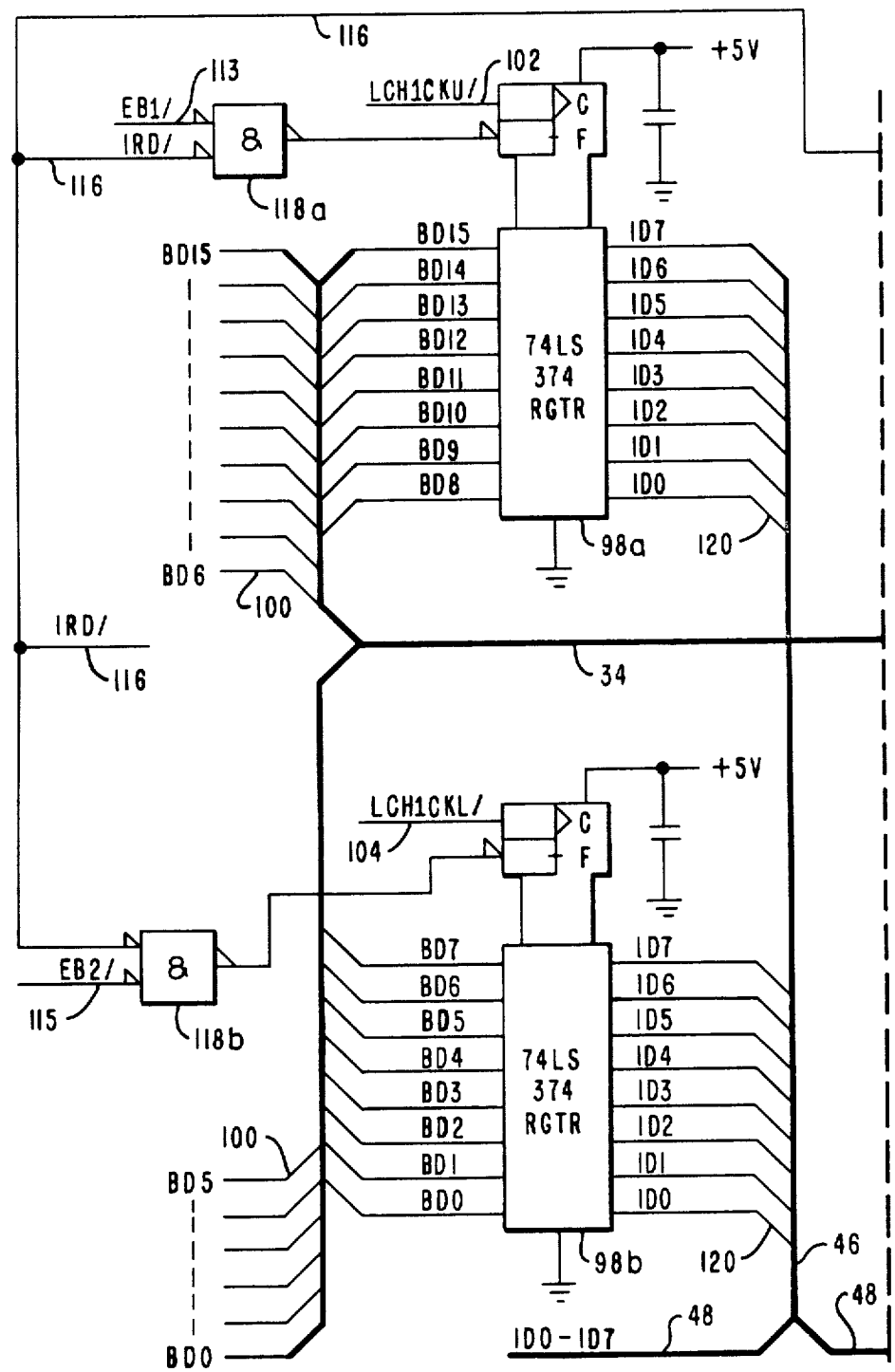
Figure 3B:
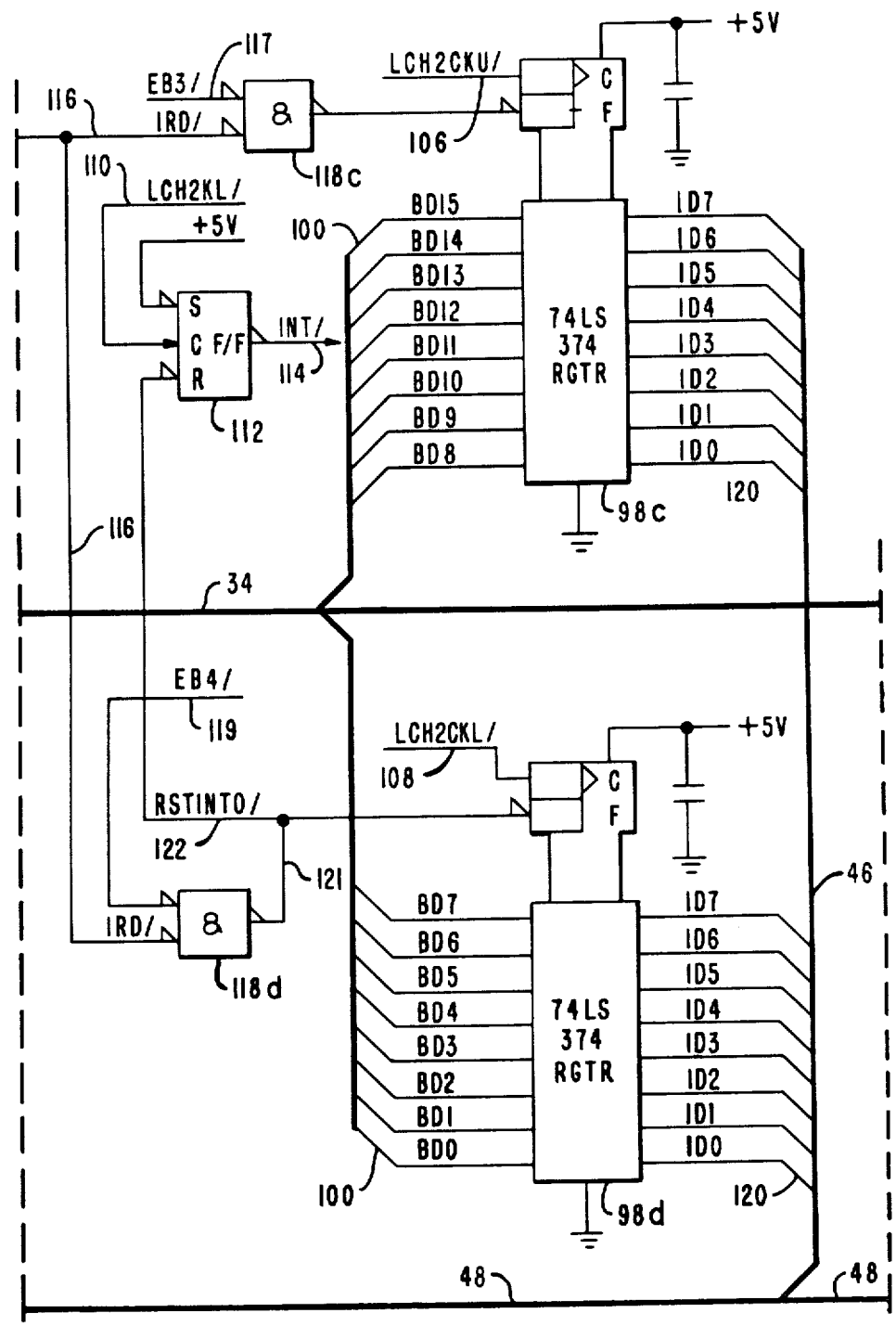

Referring now to FIGS. 3A-3C inclusive, there is disclosed a detail logic diagram of the input latches unit 42 (FIG. 2) which comprises a plurality of 74 LS374 registers 98a-98d inclusive (FIGS. 3A and 3B) while FIG. 3C discloses the output latches unit 64. The registers 98a-98d inclusive are commercially available from the Texas Instrument Corp. of Dallas, Tex. Data bits BD0-BD15 appearing on lines 100 (FIG. 3A) of bus 34 (FIG. 2) will have the lower eight data bits stored in the storage register 98b while the upper eight bits are stored in the storage register 98a under the control of active low clock signals LCH1CKU/ and LCH1CKL/ generated by the host processor 20 (FIG. 1) which simultaneously appear on lines 102 and 104 respectively of the bus 34. These clock signals will clock in the first two bytes of data outputted by the host processor 20 (FIG. 1) into the registers 98a and 98b. The last two bytes of data are simultaneously clocked into the registers 98c and 98d (FIG. 3B) over lines 100 by the active low clock signals LCH2CKU/ and LCH2CKL/ generated by the host processor 20 and appearing on lines 106 and 108 respectively. The signal LCH2CKL/ will also appear on the clock input line 110 of a flip-flop 112 (FIG. 3B) setting the flip-flop, thereby outputting an active low interrupt signal INT/ over line 114 which is part of bus 44 (FIG. 2) to the control processor 50, notifying the processor of the data stored in the registers.

In response to receiving the interrupt signal INT/, the processor 50 will generate a read signal IRD/ over line 116 (FIG. 3A) which is part of bus 44. The signal IRD/ will generate a signal on the output line of the AND gates 118a-118d inclusive (FIGS. 3A and 3B) which will enable the registers 98a-98d inclusive to output the binary bits stored in the registers over lines 120, bus 46 (FIG. 2) and bus 48 to the processor 50. The output signal RSTINTO/ (FIG. 3B) appearing on line 121 of the flip-flop 118d generated as a result of the read signal IRD/ going active low will be transmitted over line 122 to reset the flip-flop 112 clearing the interrupt signal INT/. The signals EB1/-EB4/ inclusive appearing on lines 113, 115, 117 and 119 respectively are timing signals generated by the control processor 50 in response to the control processor 50 receiving the interrupt signal INT/ and generating the read signal IRD/.

Referring now to FIG. 3C, there is disclosed the output latches unit 64 (FIG. 2) which includes a 74LS374 register 122 and a 74LS244 buffer 124. When the processor 50 wants to send data to the host processor 20, the processor 50 generates the signals IWR/ appearing on line 132 and EB4/ appearing on line 119. The write signal IWR/ is clocked through the AND gate 133 as signal BDC1 by the timing signal EB4/ to the register 122 enabling the data bits ID0-ID7 inclusive appearing on bus 48 to be stored in the register 122 over lines 125. The output signal BDC1 of the AND gate 133 appearing on line 135 is transmitted to the host processor 20, notifying the processor that data has been loaded in the registers 122 and 124. The upper eight bits of each data word outputted by the processor 50 appearing on bus 48 and comprising status signals which are to be sent to the host processor 20 are clocked into the register 124 of which only bit BD15 has any significance. If the control processor 50 has not read the input latches 98a-98d inclusive and an interrupt signal has been generated to the control processor, the signal INFUL outputted by the control processor 50 (FIG. 2) will be active high on line 130 indicating that the output latches 98a-98d inclusive (FIGS. 3A and 3B) are full. The signal INFUL will set the status bit BD15 in the register 124 indicating such a condition to the host processor 20.

When the host processor 20 (FIG. 2) wants to read the data stored in the registers 122 and 124, the processor 20 will generate the signals LCH1RDU/ appearing on line 126 and LCH1RDL/ appearing on line 128, enabling the registers 122 and 124 to output the data bits BD0–BD17 inclusive over lines 134 and bus 34 to the host processor 20.

Figure 5:
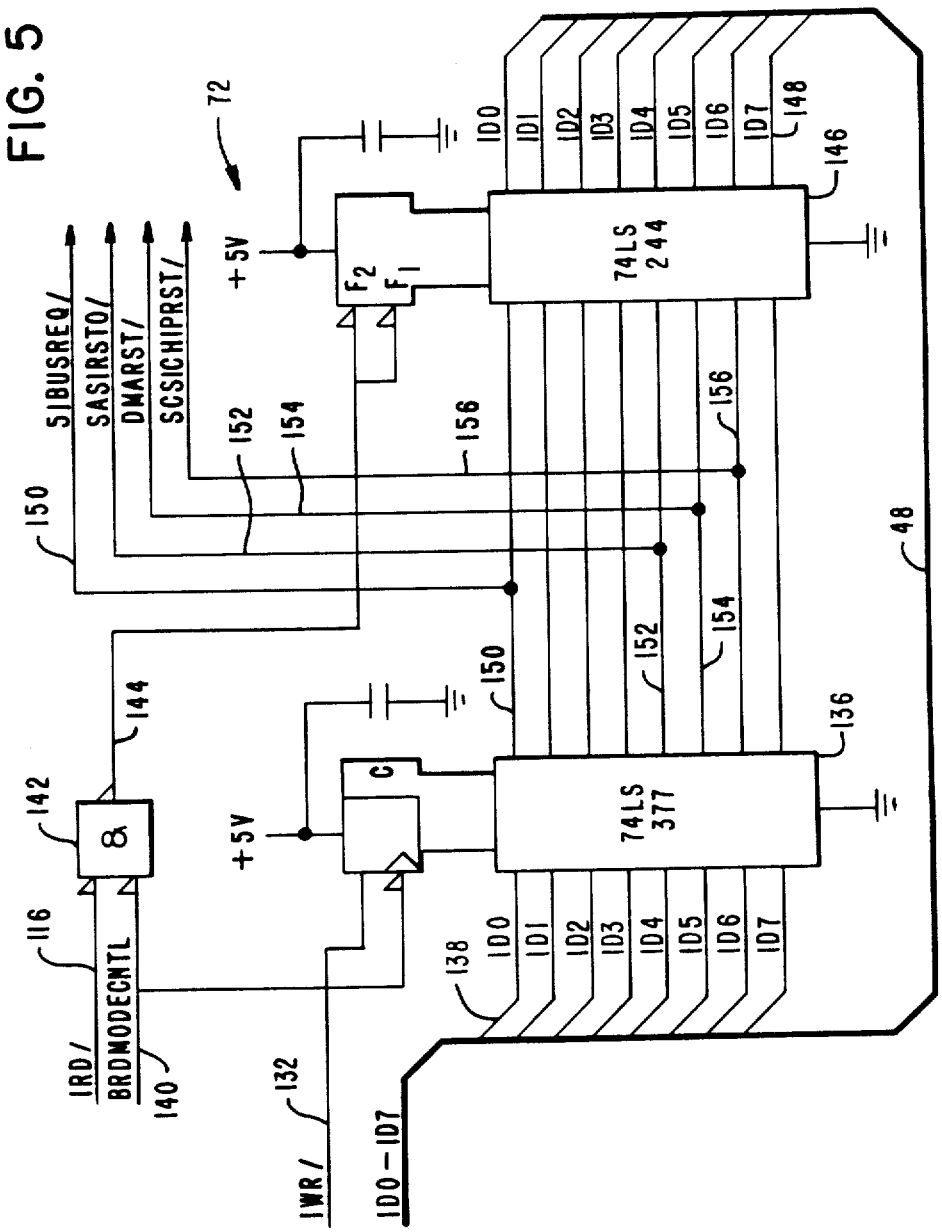
FIG. 5 is a detailed logic diagram of the board control unit.

Referring now to FIG. 5, there is disclosed a detailed logic diagram of the board control unit 72 (FIG. 2) used in controlling the operation of various elements (FIG. 2) in the host adapter 36. Included in the circuit is a 74LS377 register 136 for storing data bits ID0–ID7 inclusive transmitted from the control processor 50 and appearing on the input lines 138 of the bus 48 (FIG. 2). When the control processor 50 generates control data to be used in controlling the operation of the host adapter 36, the data signals will appear as data bits ID-0–ID7 inclusive on the input lines 138. The processor 50 will also output the control signal BRDMODECNTL over line 140 to one input of AND gate 142 and the register 136. The processor 50 will also output the write signal IWR/ over line 132 to the register 136, enabling the register to store the data. When the data is to be removed from the register 136, the processor will output the read signal IRD/ over line 116 to the AND gate 142 enabling the gate to output a control signal over line 144 to a 74LS244 buffer 146, enabling the buffer to output the data bits stored in the register 136 over lines 148 and over bus 48 to the appropriate control element in the host adapter 36.

Appearing on the output line 150 of the register 136 (FIG. 5) is a bus request signal 51BUSREQ/ generated by the processor 50 for transmission to either the DMA unit 74 (FIG. 2) or the bus controller 92 requesting access by the processor 50 to the bus 93 or the bus 87 and to prevent any subsequent transfer of data between the bus controller 92 and the DMA unit 74. Appearing on output lines 152 and 154 are the reset signals SASIRST0/ transmitted to the bus controller 92 and the reset signal DMARST/ transmitted to the DMA unit 74 which enables the processor 50 to send data to each of these units without the danger of the two units not being ready to receive the data. The signal SASIRSTO/ resets the controller 92 and any peripheral device on the bus 38 while the signal SCSICHIPRST/ appearing on line 156 is a reset signal resetting only the bus controller 92.

Figure 6:
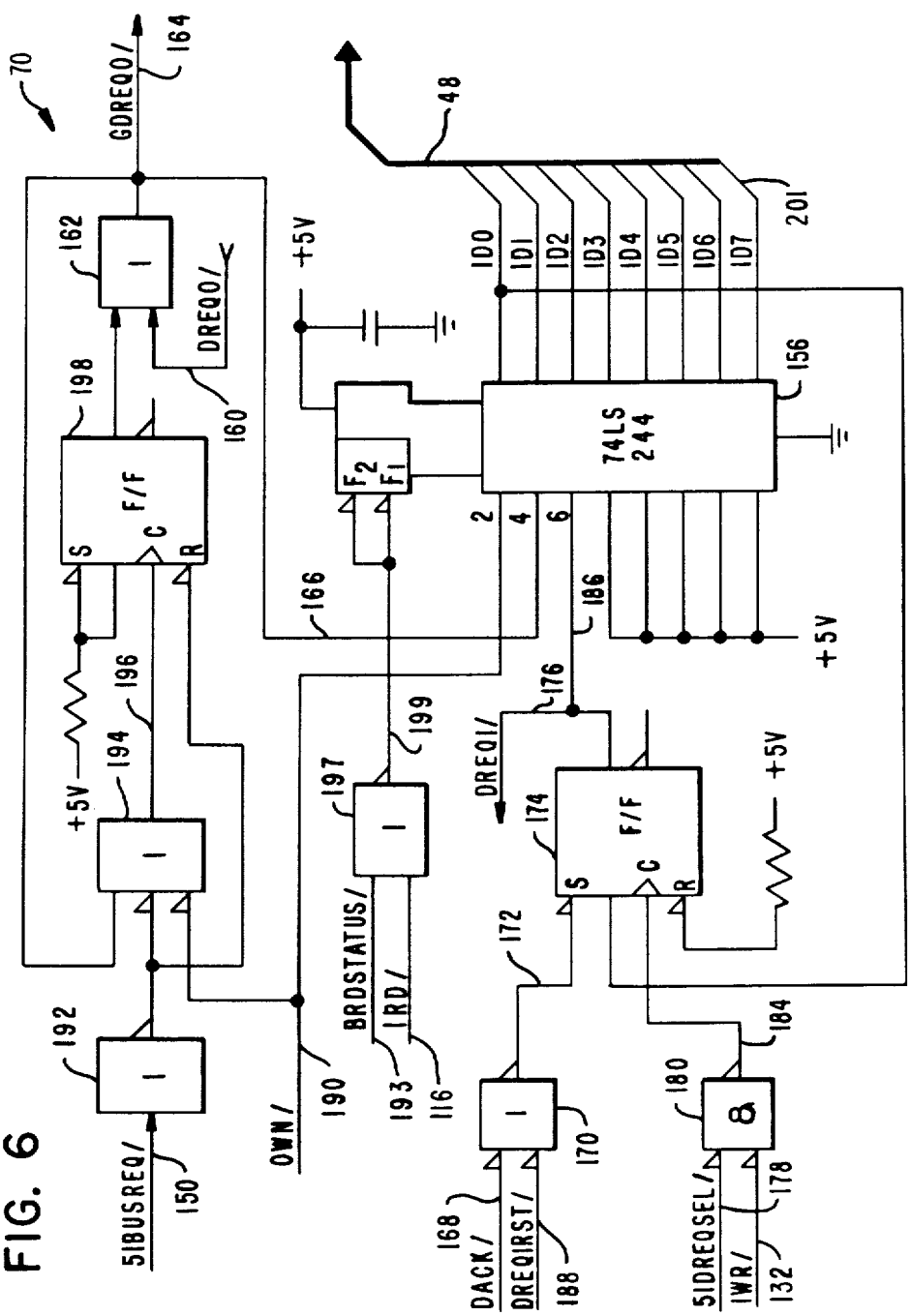
FIG. 6 is a detailed logic diagram of the board status unit of the present invention.

Referring now to FIG. 6, there is disclosed a detailed logic diagram of the board status unit 70 (FIG. 2) which allows the control processor 50 to monitor the activities of the DMA control unit 74 and the bus controller 92. The status unit 70 includes a 74LS244 buffer 156 in which data pertaining to the operating status of the DMA control unit 74 and the bus controller 92 is sensed by the control processor 50. When the DMA unit 74 has gained control of the bus 34 for transferring data between the host processor 20 (FIG. 1) and the host adapter 36, the DMA unit 74 will output the active low signal OWN/ over line 190 to pin 2 of the buffer 156.

The bus controller 92 (FIG. 2) will generate a data request signal DREQ0/ over line 160 when the controller wants the DMA unit 74 to transfer a byte of data between the host processor 20 and a peripheral device such as a disc memory 40 (FIG. 2) requiring the DMA control unit 74 to obtain control of the bus 34. This signal is transmitted through the OR gate 162 and appears on the output line 164 as signal GDREQ0/ which is transmitted to the DMA unit 74 and over line 166 to pin 4 of the buffer 156.

When the control processor 50 wants data to be transferred between the host processor 20 (FIG. 1) and the input latches unit 88 or the output latches unit 90 (FIG. 2), the processor 50 will generate the signal 51DREQSEL/ over line 178 to one input of AND gate 180 and also the timing signal IWR/ over line 132 to the other input of gate 180 allowing the gate 180 to output a signal over line 184 to the clock input of the flip-flop 174 enabling the flip-flop to output the signal DREQ1/ over line 176 to the DMA unit 74. The signal DREQ1/ will also appear on line 186 to pin 6 of the buffer 156. The signal DREQ1/ notifies the DMA unit 74 that the control processor 50 wants the DMA unit to gain control of the bus 34 preparatory to the transfer of data between the host processor 20 and the processor 50. In response to receiving this signal, the DMA unit 74 will, after obtaining control of the bus 34, output the acknowledgment signal DACK/ over line 168 to one input of the OR gate 170 whose output signal over line 172 will reset the flip-flop 174, disabling the signal DREQ1.

When the control processor 50 wants to remove the signal DREQ1/ appearing on line 176, the processor will generate the reset signal DREQIRST/ over line 188 which disables the flip-flop 174 from outputting the signal DREQ1/. When the DMA unit 74 gains control of the bus 34 in response to the generation of the signals GDREQ0/ or DREQ1/, the signal OWN/ appearing on line 190 will be inputted into pin 2 of the buffer 156.

When the control processor 50 (FIG. 2) wants to stop any further transfer of data between the host processor 20 and the bus controller 92 over buses 34 and 93 (FIG. 2) which is under the control of the DMA unit 74, the processor 50 will cause the active low signal 51BUSREQ/ (FIG. 5) to appear on line 150 which is inverted by the inverter 192 and inputted into a NOR gate 194 whose output signal on line 196 will clock a flip-flop 198 when the signals OWN/ and GDREQ0/ go high at the completion of a DMA unit transfer operation. The clocking of the flip-flop 198 results in the disabling of the active low signal GDREQ0/ appearing on the output line 164 of the OR gate 162. Before the control processor 50 initiates a bus request operation, the processor will generate an inquiry signal BRDSTATUS/ over line 193 and the read timing signal IRD/ over line 116 to the OR gate 197 whose output signal over line 199 enables the buffer 156 to output the data bits appearing on the input pins 2, 4 and 6 over lines 201 and bus 48 to the processor 50 indicating the status of the buses 34 and 93.

Figure 7:
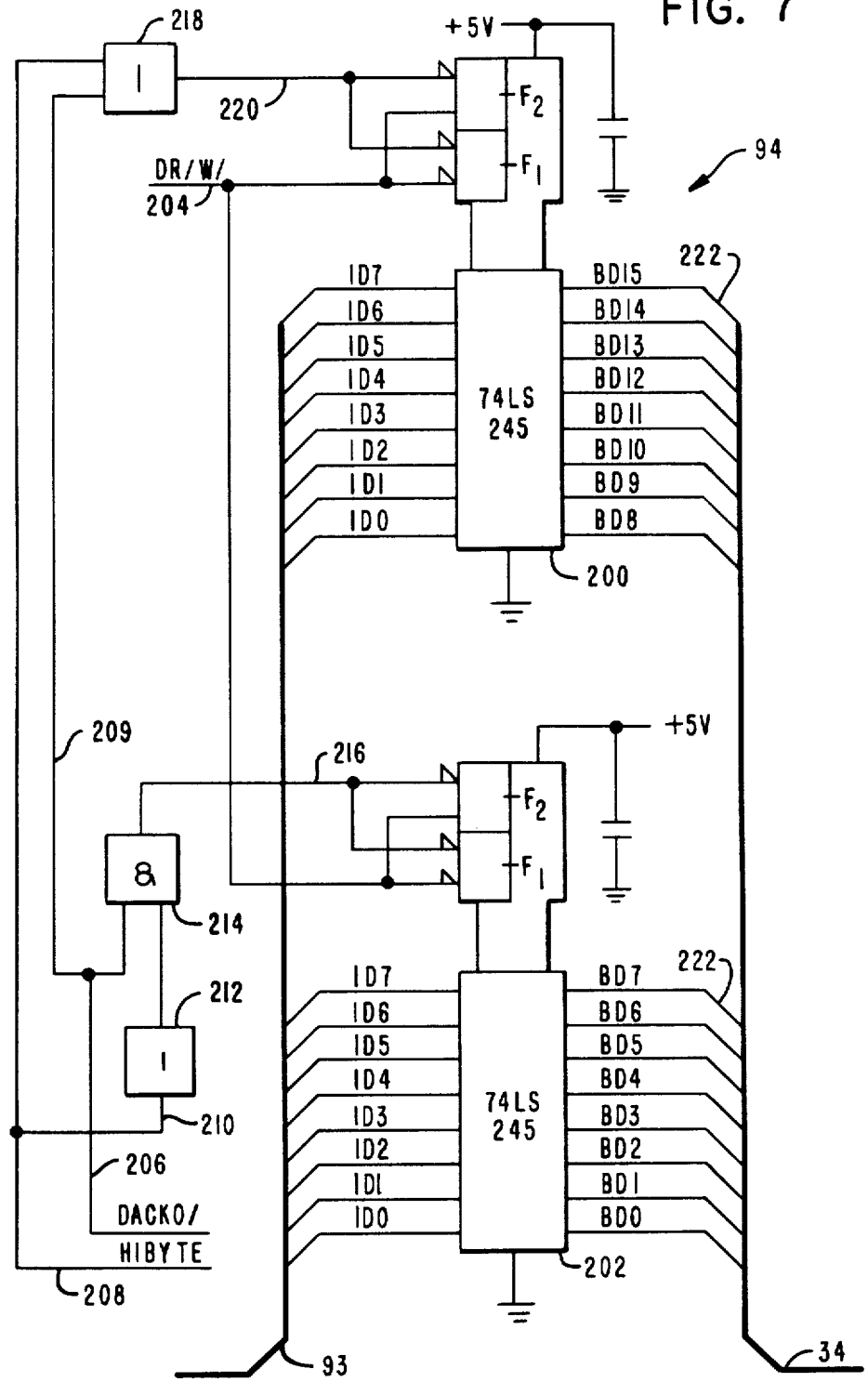
FIG. 7 is a detailed logic diagram of a portion of the bus converter of the present invention.

Referring now to FIG. 7, there is shown a detailed logic diagram of a portion of the bus converter 94 (FIG. 2) which includes a pair of 72LS245 transceivers 200 and 202 respectively connected to the data bus 93 (FIG. 2) and the bus 34 for transmitting data between the bus controller 92 and the host processor 20 (FIG. 1). When data is required to be transferred over the 8-bit bus 93 from the bus controller 92, the controller 92 will place eight bits of data 100–107 inclusive on the bus 93 and notify the DMA unit 74 over line 95 (FIG. 2) of this event. The DMA unit 74 will then generate the signal DR/W/ on line 204 which controls the direction of flow of data from the transceivers 200 and 202 and the clocking signal DACK0/ on line 206 which alternately enables transceiver 200 to receive the data and disables transceiver 202 from receiving the data. A control signal HIBYTE appearing on line 208 and generated by the DMA unit 74 in response to receiving the signal GDREQ0/ (FIG. 6), is transmitted over line 210 and through the OR gate 212 to one input of the AND gate 214 whose other input receives the timing signal DACK0/ over line 206, both of which control the operation of the transceivers 202 over line 216. The signals DACK0/ and HIBYTE are also transmitted over line 209 and 208 respectively through the OR gate 218 and over line 220 to control the operation of the transceiver 200. Each byte of data outputted by the controller 92 over bus 93 (FIG. 2) will alternatively be outputted over lines 222 to the bus 34 by the enabling of the transceivers 200 and 202 under the control of the signals DACK0/ and HIBYTE. The signal HIBYTE changes state each time the signal GDREQ0/ is generated.

Figure 8A:
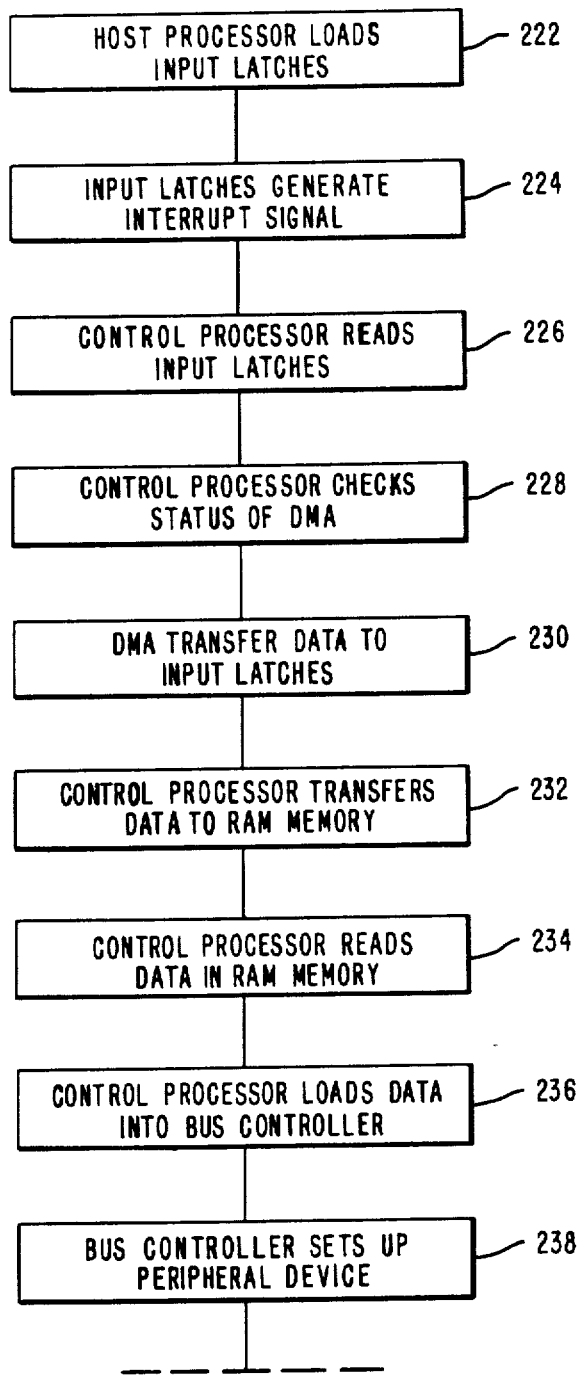
FIGS. 8A and 8B, taken together, constitute a flow chart of the operation of the interface adapter during a read operation.
Figure 8B:
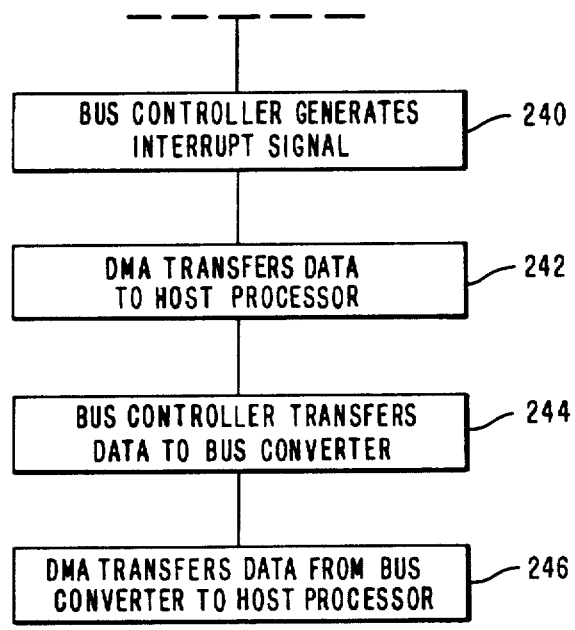

Referring now to FIGS. 8A and 8B, there is shown a flow chart of an operation of the data processing system of the present invention. Where a peripheral device such as the U.P.C. scanner 32 (FIG. 1) scans a U.P.C. label, data pertaining to the merchandise item to which the label is attached is transmitted through the terminal device 26 to the host processor 20. In response to receiving this data, the processor 20 will initiate a price look-up procedure in which the host processor will load four bytes of data (block 222) into the input latches unit 42 (FIG. 2). As the last byte of data is loaded into the register 92d (FIG. 3B), the interrupt signal INT/ (FIG. 3B) is generated (block 224) over line 114 to the control processor 50 (FIG. 2). In response to receiving the interrupt signal, the processor 50 will read (block 226) the four bytes of data stored in the input latches unit 42 which data include a one byte function code and three bytes of address data pertaining to this operation stored in the main memory 22 (FIG. 1) of the host processor 20. The stored data will identify the type of operation and the location on the disc memory 40 (FIG. 2) where the price of the merchandise is stored.

The processor 50 generates the signal 51BUSREQ/ (FIG. 5) and then checks (block 228) the status of the DMA control unit 74 (FIG. 2) by reading the output signals of the register 156 (FIG. 6). After finding that the DMA unit 74 is available for operation as indicated by the three output signals of the register 156 being in a high state, the processor 50 will transfer instructions to the DMA control unit 74 through the output latches unit 90 (FIG. 2) and the address latches unit 80 enabling (block 230) the DMA control unit to transfer data from the main memory 22 of the host processor 20 to the input latches unit 88 and generates an interrupt signal DTC (FIG. 2) over line 91. The control processor 50, in response to receiving the interrupt signal, transfers (block 232) the data stored in the input latches unit 88 over buses 89 and 48 to the RAM memory unit 60 (FIG. 2) for storage therein.

The processor 50 reads (block 234) the data stored in the RAM unit 60 which tells the processor 50 what device on the bus 38 is to transmit data to the host processor 20 and where the received data is to be stored. The processor 50 then loads (block 236) data pertaining to the transfer of data from the disc memory unit 40 (FIG. 2) into the bus controller 92. The bus controller 92 then sets up (block 238) the disc memory unit 40 to allow for the transfer of data from the memory unit to occur and generates an interrupt signal (block 240) to the control processor 50. The control processor 50 in response to receiving the interrupt signal sets up the DMA unit 74 to gain control of the bus 34 enabling data (block 242) to be transferred from the bus converter 94 to the host processor 20 (FIG. 1) when enabled. The bus controller 92 then transmits (block 244) the data received from the disc memory unit 40 to the bus converter 94 and generates the control signal DREQ0/ (FIG. 6) to the DMA control unit 74, notifying the unit of the data stored in the bus converter 94, and enabling the DMA control unit 74. The DMA control unit 74 will cyclically output the control signals DACK0/ and HIBYTE to the bus converter 94 in response to receiving the signal DREQ0/ for transmitting each byte of data (block 246) over the sixteen bit bus 34 to the host processor 20.

While the principles of the invention have now been made clear in an illustrated embodiment, it will be obvious to those skilled in the art that many modifications of structure, arrangements, elements and components can be made which are particularly adapted for specific environments and operating requirements without departing from these principles. The appended claims are therefore intended to cover and embrace and such modifications, within the limits only of the true spirit and scope of the invention.

We claim:

1. In a data processing system comprising a remote processor configured to process data words of a first length and a plurality of remote peripheral devices configured to process data words of a second length, an interface means for interfacing said remote processor and the remote peripheral devices comprising:

a control processor for controlling the transfer of data between one of the remote peripheral devices and the remote processor;

transfer means for transferring data between the interface means and the remote processor when enabled;

controller means for controlling the transfer of data between the remote peripheral devices and the interface means;

first storage means coupled to said remote processor over a first bus means and said control processor over a second bus means for storing first transfer data transmitted by said remote processor, said first storage means generating an interrupt signal to said control processor in response to the storing of said first transfer data enabling said control processor to read the first transfer data stored in the first storage means;

second storage means coupled to said remote processor over said first bus means and coupled to said control processor over said second bus means for storing second transfer data transferred from said remote processor by said transfer means in response to the control processor reading the first transfer data, said transfer means generating a second interrupt signal to the control processor in response to the storing of said second transfer data in said second storage means;

third storage means coupled to said second storage means and said control processor, said control processor transferring the second transfer data from said second storage means to said third storage means in response to receiving said second interrupt signal, said control processor further reading the second transfer data in response to the storing of the second transfer data in the third storage means;

fourth storage means coupled to said remote processor over said first bus means and the controller means over a third bus means for storing a plurality of data words of said second length transferred over said third bus means from one of the remote peripheral devices by said controller means in response to the control processor reading the second transfer data stored in said third storage means;

said transfer means being coupled to said fourth storage means and outputting a plurality of first control signals to said fourth storage means enabling said fourth storage means to sequentially output the data words of said second length over said first bus means for transmission to said remote processor.

2. The interface means of claim 1 which further includes fifth storage means coupled to said transfer means, and coupled to said controller means and said control processor for storing data representing the operating status of said transfer means and said controller means, said control processor outputting a second control signal to said fifth storage means enabling the fifth storage means to output the operating status data to the control processor allowing the control processor to monitor the operating status of the transfer means and the controller means.

3. The interface means of claim 2 in which said first storage means include a plurality of storage registers each storing one byte of said first transfer data when enabled, said remote processor outputting an enabling signal to each of the storage registers for storing the first transfer data therein, said interface means further including logic means connected to said remote processor and said control processor for receiving one of said enabling signals upon the storing of the last byte of said first transfer data whereby the logic means outputs said first interrupt signal to said control processor in response to receiving one of said enabling signals.

4. The interface means of claim 3 in which said fourth storage means includes a plurality of transmitting means for receiving data words of said second length from said third bus means and for transmitting said data words of said second length over said first bus means, said controller means outputting a plurality of data words of said second length received from one of said remote devices over said third bus means and a third control signal to said transfer means whereby in response to receiving said third control signal, said transfer means outputs said first control signals to said transmitting means for sequentially enabling each of said transmitting means to transmit over said first bus means one of said data words of said second length in response to receiving one of said first control signals.

5. The interface means of claim 4 in which said one of said first control signals includes a cyclically generated control signal for sequentially enabling each one of the transmitter means to output one byte of a data word of said second length in response to receiving the cyclically generated control signal.

6. The interface means of claim 5 in which the controller means outputs said third control signal to said transfer means each time the controller means outputs a data word of said second length over said third bus means to said fourth storage means and in which said transfer means outputs said cyclically generated control signal to said plurality of transmitter means in response to receiving said third control signal.

7. In a data processing system comprising a remote processor configured to process data words of a first length and which includes a memory portion for storing data transfer commands and a remote storage member configured to store data words of a second length, an apparatus for coupling the remote processor to the remote storage member comprising:

a control processor for controlling the transmission of data words between the remote processor and the storage member;

a data transfer member coupled to the remote processor over a first data transfer bus and coupled to the control processor over a second data transfer bus for transferring data words between the remote processor and the storage member when enabled;

a bus controller coupled to the storage member over a third data transfer bus and a control processor for transmitting data words between the connecting apparatus and the storage member;

first storage latches coupled to said remote processor over said first data transfer bus and coupled to said control processor over said second data transfer bus for storing address data transmitted by the remote processor representing the storage location of the data transfer commands in the memory portion, said first storage latches outputting a first interrupt signal over the second data transfer bus to said control processor in response to the storing of the address data in the storage latches, enabling said control processor to read the address data stored in the first storage latches, said control processor enabling the transfer member to use the address data to transfer the data transfer commands from the memory portion to the connecting apparatus in response to receiving the first interrupt signal;

second storage latches coupled to said remote processor over said first data transfer bus and said control processor over said second data transfer bus for storing the data transfer commands transferred from the memory portion of the remote processor by the transfer member, said transfer member generating a second interrupt signal to the control processor upon the storing of the data transfer commands in the second storage latches enabling the control processor to read the data transfer commands;

memory means coupled to said second storage latches and said control processor for storing the data transfer command transferred by the control processor from the second storage latches in response to the generation of the second interrupt signal enabling the control processor to read the data transfer commands stored in the memory means; and a pair of data transmitting means each coupled to said remote processor over said first data transfer bus, and coupled to said transfer member and to the bus controller over a fourth data transfer bus for storing a byte of a data word of said second length transferred over said third data transfer bus from the storage member by the bus controller in response to the control processor reading the data transfer commands stored in said memory means, said bus controller outputting a first control signal to the transfer member, whereby said transfer member outputs second and third control signals to said data transmitting means enabling said transmitting means to sequentially transmit each byte of data of said second length over said first data transfer bus to the remote processor.

8. The apparatus of claim 7 which further includes a buffer member coupled to said transfer member, and coupled to said bus controller and said control processor for storing a first data bit when the transfer member is ready to transmit data over said first data transfer bus, and for storing a second data bit when the bus controller has requested the transfer member to transfer data between the remote processor and the remote storage member, said control processor outputting a fourth control signal to said buffer member enabling the buffer member to output the first and second data bits to the control processor allowing the control processor to monitor the operating status of the transfer member and the bus controller.

9. The apparatus of claim 8 in which said first storage latches each store one byte of said address data when enabled, said remote processor outputting an enabling signal to each of said first storage latches for storing the address data therein, said apparatus further including a bistable device coupled to said remote processor and coupled to said control processor for receiving one of said enabling signals upon the storing of the last byte of said address data in the first storage latches whereby the bistable device outputs said first interrupt signal to said control processor in response to receiving said one of said enabling signals.

10. The apparatus of claim 9 in which the second control signal is cyclically outputted by said transfer member for enabling each of the data transmitting means to output one byte of data over said first data transfer bus to said remote processor.

11. The system of claim 10 in which the bus controller outputs said fourth control signal to said transfer member each time the bus controller outputs a byte of data word of said second length on said fourth data transfer bus, said transfer member outputting said second control signal in response to receiving said fourth control signal.

* * * * *